United States Patent Office 3,523,009
Patented Aug. 4, 1970

3,523,009
RECOVERY OF ALUMINUM CHLORIDE FROM SPENT ALUMINUM CHLORIDE ALKYLATION CATALYST SLUDGE
Charles M. Weiss, Baltimore, Md., assignor to Continental Oil Company, Ponca City, Okla., a corporation of Delaware
No Drawing. Filed Mar. 10, 1969, Ser. No. 805,876
Int. Cl. C01b 7/08; C01f 7/56
U.S. Cl. 23—92                                   9 Claims

ABSTRACT OF THE DISCLOSURE

A method for recovering aluminum chloride from spent aluminum chloride alkylation catalyst sludge is provided wherein the sludge is first contacted with an inert gas at elevated temperatures and reduced pressures for a period of time effective to remove a portion of dissolved HCl gas present in the sludge. The HCl-stripped sludge is then hydrolyzed, and the water layer containing the aluminum chloride is separated by gravity settling from the organic phase and subjected to a series of purification steps. These purification steps include sand or charcoal filtration, percolation for absorption of the dissolved organics and ion exchange resin treatment for eliminating iron and residual hydrogen chloride.

BACKGROUND OF THE INVENTION

Field of the invention

This invention relates to a process for recovery of metal halides from spent catalyst masses obtained in the treatment of hydrocarbons with metal halides. In one aspect the invention relates to the recovery of aluminum chloride from spent alkylation catalyst sludge. In a more specific aspect the invention relates to a method for recovering an aqueous aluminum chloride solution essentially free of contaminants from spent aluminum chloride alkylation catalyst sludge.

Brief description of the prior art

Friedel-Crafts catalysts, such as aluminum chloride, are widely used as catalysts in hydrocarbon systems, such as an olefin reaction with aromatics to form alkyl aromatics, or alkyl chloride reaction with aromatics to form alkyl aromatics. An important reaction which has been conducted commercially in the past several years has been the manufacture of biodegradable detergent alkylates in which aluminum chloride is employed to catalyze the reaction of benzene with alkyl chlorides. However, in such a reaction a complex of aluminum chloride and organic compounds is formed as a by-product which is commonly referred to as a "sludge." The sludge is a complex of the catalyst and the hydrocarbon and results from the refining, polymerization, condensing or cracking of hydrocarbons with aluminum chloride catalyst. In the past it has been customary to hydrolyze the sludge with an excess of water, thereby forming a dilute aqueous aluminum chloride solution which was then discarded. Thus, processes are constantly being sought which can produce an aqueous solution of aluminum chloride that can be marketed as a technical grade solution. In addition to yielding a profit by the recovery of the aluminum chloride from the spent aluminum chloride alkylation catalyst, the recovery of the aqueous aluminum chloride solution results in the elimination of a major pollutant from plant waste water streams.

OBJECTS OF THE INVENTION

An object of the present invention is to produce an aqueous aluminum chloride solution from spent aluminum chloride alkylation catalyst sludge.

Another object of the invention is to produce an aqueous aluminum chloride solution which is essentially free of contaminants.

These and other objects, features and advantages of the present invention will be apparent to those skilled in the art from the reading of the following detailed description and appended claims.

SUMMARY OF THE INVENTION

According to the present invention a method for recovery of an aqueous aluminum chloride solution essentially free of contaminants from spent aluminum chloride alkylation catalyst sludge is provided wherein the sludge is contacted with an inert carrier gas at elevated temperatures and reduced pressures for a period of time effective to remove a portion of dissolved HCl gas present in the sludge. The HCl-stripped sludge is then hydrolyzed with water and the hydrolyzed sludge is passed into a settling zone in order to allow the hydrolyzed sludge to form a water phase and an organic phase. The water phase, which contains the desirable aluminum chloride, is then separated from the organic phase and the water phase is filtered. The filtered water phase is then passed through a percolation zone containing activated carbon. The product stream is then contacted with a dilute hydrogen peroxide solution to oxidize the ferrous ions present in the product stream to the ferric ion so that upon passing the product stream through a second percolation zone containing an anion exchange resin the ferric ions are removed from the product stream. The partially purified product stream is then passed through a third percolation zone containing an ionic exchange resin to remove substantially all of the remaining dissolved HCl present in the product stream.

Further, according to the invention, I have found that by recycling a portion of the water phase in the settling zone to the hydrolysis zone, to provide a ratio of about 5 to about 25 parts water phase per part of alkylation sludge fed into the hydrolysis zone more efficient phase separation occurs in the settling zone immediately following the hydrolysis of the aluminum chloride alkylation sludge.

DESCRIPTION OF THE PREFERRED EMBODIMENTS

Detergent compositions prepared from biodegradable alkali metal salts of linear alkyl aryl sulfonates, such as the sodium salt of linear alkyl benzene sulfonates, have been widely used in recent years. These sulfonates are manufactured by first producing a detergent alkylate which, upon sulfonation and neutralization, produces the biodegradable alkali metal salts of the linear alkyl aryl sulfonates. The detergent alkylate produced by the aluminum chloride catalyzed alkylation of an aryl compound with a chlorination product prepared by partially chlorinating a petroleum derived hydrocarbon fraction consisting essentially of $C_{10}$ to $C_{18}$ straight chain paraffins, as disclosed in U.S. Pat. 3,316,294 (1967), has produced a by-product known as sludge which is a complex of organic compounds and the spent aluminum chloride catalyst. Further, such sludge and the treatment of same is disclosed in the co-pending application of inventors McCleskey, Feighner and Marshall entitled "Disposal of Spent $AlCl_3$ Alkylation Catalyst Sludge," U.S. Ser. No. 805,684, filed Mar. 10, 1969. Past practice has been to hydrolyze the sludge with excess water and discharge a dilute aluminum chloride liquor to the sewer. However, such a loss represents not only a loss in profit but also creates a major pollution problem resulting from plant waste water streams. Thus, it is to the treatment of alkylation sludge and the recovery of an aqueous aluminum chloride solution which is substantially free of contaminants that the present invention is directed.

The sludge is recovered from the alkylation zone employed in the preparation of the detergent alkylate and is passed into a vacuum stripping zone where the sludge is admixed with an inert carrier gas at a temperature within the range of about 100 to 160° F. and at a reduced pressure of about 125 to 250 mm. Hg in an amount and for a period of time effective to remove a portion of dissolved HCl gas present in the sludge. Desirable results have been obtained wherein the carrier gas and sludge were continuously admixed in a stirred reactor vessel maintained at a pressure of 125 to 250 mm. Hg and at a temperature of 140° F. for a period of from .4 to .6 hour. Further, the flow rate of the inert carrier gas is preferably about 36 liters/hour per liter of sludge. The vacuum stripping results in the removal of about 20 percent of HCl in the feed, which is advantageous to product purification down stream. The carrier gas employed can be any gas which is inert to the sludge being contacted with same. For example $CO_2$, air, and the mixtures of $CO_2$ and air can be employed as the carrier gas for removing the dissolved HCl from the sludge in the first purification step. The following table illustrates the effect of removing the HCl gas content from the sludge by contacting the sludge with an inert carrier at the reduced pressure and elevated temperatures previously mentioned.

separated water phase to the hydrolysis zone to provide effective separation of the water and organic phase. The recycle features will be discussed in detail hereinafter.

TABLE II

| | 10 min. | 20 min. | 30 min. | 40 min. |
|---|---|---|---|---|
| 100° F.: | | | | |
| Organic phase (ml.) | 130 | 150 | 172 | 172 |
| Water phase (ml.) | 120 | 100 | 78 | 78 |
| 120° F.: | | | | |
| Organic phase (ml.) | 170 | 176 | 176 | 176 |
| Water phase (ml.) | 80 | 74 | 74 | 74 |
| 140° F.: | | | | |
| Organic phase (ml.) | 170 | 176 | 176 | 176 |
| Water phase (ml.) | 80 | 74 | 74 | 74 |
| 160° F.: | | | | |
| Organic phase (ml.) | 176 | 176 | 176 | 176 |
| Water phase (ml.) | 74 | 74 | 74 | 74 |

Analyses were made on the organic phase and the water phase of each of the above four temperatures to determine the effectiveness of the phase separation.

The water phase of the 100° F. run contained 133 p.p.m. organic compounds, and the organic phase of the same run contained 14,605 p.p.m. water and 1,335 p.p.m. aluminum. In the run conducted at 120° F. the water

TABLE I

| | Sludge, vol. (l.) | Carrier[2] l./hr. | Pressure, mm. Hg | Time, hours | Temp., ° F. | Sludge, HCl content (percent) | |
|---|---|---|---|---|---|---|---|
| | | | | | | Before | After |
| Run: | | | | | | | |
| 1 | 1 | 14 | 500 | 2.3 | 140 | 3.12 | 2.70 |
| 2 | 1 | 8 | 250 | 1.0 | 140 | 2.70 | 2.55 |
| 3 | 1 | 42 | 500 | 0.5 | 140 | 3.15 | 2.90 |
| 4 | 1 | 36 | 250 | 0.6 | 140 | 3.15 | 2.48 |
| 5 | 1 | 36 | 125 | 0.4 | 140 | 3.15 | 2.46 |

[1] 30% $CO_2$, 70% air.

Once the aluminum chloride sludge has been contacted with the inert carrier gas at the reduced pressure and elevated temperature described above, the HCl-stripped aluminum chloride sludge composition is then passed into a hydrolysis zone where the sludge is contacted with an amount of water effective to hydrolyze the sludge. The water and the sludge are fed into the hydrolysis zone in about equal volumes. The hydrolysis zone is equipped in such a manner to provide thorough admixing of the water and sludge. The aluminum chloride strength of the complex will dictate the exact amount of water needed to produce a 32° Baumé or a 28 percent final product concentration. The reaction mass is maintained at a temperature in the range of about 140 to 160° F. for a sufficient period of time to allow substantially all of the sludge to be hydrolyzed. Normally, a residence time of from about 1.5 minutes or more is needed to effectively hydrolyze the aluminum chloride sludge at the temperature in the range of 140 to 160° F.

The hydrolyzed sludge is then passed into a settling zone whereby the hydrolyzed sludge is allowed to form a water phase and an organic phase. A gravity settler can be employed for this separation into the organic phase and the water phase containing the aluminum chloride product. The hydrolyzed sludge is maintained in the settling zone at a temperature within the range of about 100 to 160° F. for a period of time effective to form the water phase and the organic phase. Preferably, the hydrolyzed sludge is maintained at a temperature of 140 to 160° F. for a residence time of about 20 to 40 minutes in the settling zone to effect an acceptable split of the organic phase and the water phase.

Data illustrating the effect of time and temperature upon phase separation is illustrated in Table II. This data includes the results of recycling a portion of the phase contained 145 p.p.m. organic compounds and the organic phase contained 2,741 p.p.m. water and 213 p.p.m. aluminum. In the run conducted at 140° F. the water phase contained 201 p.p.m. organic compounds and the organic phase contained 2,054 p.p.m. water and 86 p.p.m. aluminum. The water phase of the run conducted at 160° F. contained 251 p.p.m. organic compounds, while the organic phase contained 1,358 p.p.m. water and 59 p.p.m. aluminum. Thus, when comparing the amount of aluminum retained in the organic phase of the above four runs one can readily see that less aluminum is retained in the organic phase when the phase separation is carried out at a temperature within the range of 140 to 160° F.

The water phase containing the aluminum chloride is then separated from the organic phase. The organic phase may then be fractionated to recover benzene and other materials from the organic phase. The water phase is then divided into a recycle stream and a product stream. The recycle stream is then passed through a coalescer zone containing sand which reduces the recycle stream's fouling tendency, i.e. to prevent fouling of the tubes of the heat exchanger of the cooling zone. The recycle stream is then passed through a cooling zone wherein the recycle stream is cooled prior to returning the cooled recycle stream to the hydrolysis zone at a temperature effective to maintain the temperature in the hydrolysis zone within the range of about 140 to 160° F. The cooling zone can be of any suitable equipment, such as a water-cooled heat exchanger. The cooling of the recycle zone is important because the temperature of the exothermic hydrolysis reaction is controlled by means of controlling the temperature of the recycle stream and passing the recycle stream into the hydrolysis zone in an efficient amount to readily control the temperature within the desired range.

I have found that by recycling a portion of the water phase to the hydrolysis zone, a more efficient phase separation can be obtained. The recycle stream flow rate is from about 5 to 25 times the rate of the alkylation sludge fed into the hydrolysis. Data illustrating the effect is provided in Table III.

percolation zone. The water phase is maintained at a temperature in the range of about 75 to 160° F. during passage through the percolation zone, and the water phase is passed through the percolation zone at a flow rate about 0.1 to 0.5 g.p.m. per sq. ft. of cross sectional bed area of said percolation zone. Desirable results, which

TABLE III

| Ratio, recycle/ sludge | Settling Rates (160° F.) | | | Analysis | | |
|---|---|---|---|---|---|---|
| | Elapsed time, min. | Organic phase, ml. | Water phase, ml. | Organic phase | | Water phase |
| | | | | $H_2O$, p.p.m. | Al, p.p.m. | Organics, p.p.m. |
| 0/1 | 10 | 90 | 100 | 1,200 | 54 | 2,030 |
| | 20 | 86 | 114 | | | |
| | 30 | 86 | 114 | | | |
| | 40 | 86 | 114 | | | |
| 5/1 | 10 | 30 | 170 | 583 | 50 | 61 |
| | 20 | 26 | 174 | | | |
| | 30 | 26 | 174 | | | |
| | 40 | 26 | 174 | | | |
| 10/1 | 10 | 20 | 180 | 601 | 45 | 100 |
| | 20 | 16 | 184 | | | |
| | 30 | 16 | 184 | | | |
| | 40 | 16 | 184 | | | |
| 20/1 | 10 | 10 | 190 | 767 | 35 | 24 |
| | 20 | 8 | 192 | | | |
| | 30 | 8 | 192 | | | |
| | 40 | 8 | 192 | | | |
| 25/1 | 10 | 10 | 190 | 900 | 72 | 56 |
| | 20 | 8 | 192 | | | |
| | 30 | 8 | 192 | | | |
| | 40 | 8 | 192 | | | |

The remainder of the water phase is then filtered to remove any undissolved or floating oil which may be present in the water phase. The water phase is maintained at a temperature in the range of about 100 to 160° F. and is filtered downwardly at a flow rate of about 0.1 to 0.5 g.p.m. per sq. ft. of cross sectional area of the filter. Any suitable filter medium can be used, such as sand or granular carbon. However, due to its lightness in weight and its ease in handling and support in the columns, granular carbon is the preferred filter medium. Further, the granular carbon is more efficient. Data illustrating the effectiveness of the filtration of the water phase to remove organic compounds from the water phase is readily illustrated in the following table.

TABLE IV

| Conditions | | |
|---|---|---|
| Bed material | Concrete sand | Pittsburgh CAL carbon. |
| Bed dimensions, dia. x depth, in. | 2.5 x 3 | 0.75 x 25. |
| Bed volume, cc | 300 | 150. |
| Bed weight, dry, g | 450 | 68. |
| Feed rate, ml./min | 13 | 13. |
| Temperature, ° F | 100–120 | 100–120. |
| Direction of flow | Downward | Downward. |

| | Effluent stream analysis | |
|---|---|---|
| Throughput, ml. (cumulative) | Organics, p.p.m. (sand) | Organics, p.p.m. (carbon) |
| Unfiltered feed, average | 350 | 409 |
| 2,000 | 52 | 21 |
| 4,000 | 70 | 26 |
| 6,000 | 67 | 33 |
| 8,000 | 81 | |
| 10,000 | 79 | 41 |
| Bed material dosage, lbs./lb. $AlCl_3$ | 0.128 | 0.019 |

The filtrate from the above step is then subjected to a second purification zone wherein the remaining dissolved organics contaminants are extracted. The removal of the dissolved organic contaminants from the water phase is accomplished via activated charcoal absorption in a are indicated in the table below, readily show the further purification by the removal of organic compounds and a portion of the iron due to the passing of the water phase through the percolation zone containing the activated carbon.

TABLE V

A.:
Type carbon and weight, Pittsburgh CAL, 192 g.
Bed dimensions, dia. x depth, in., 1 x 36.
Temperature, ° F., ambient.
Flow rate and direction, 10 ml./min.—up.

| | Effluent stream analysis | |
|---|---|---|
| Throughput, liters (cumulative) | Organics, p.p.m. | Odor |
| Influent, average | 188.0 | Pronounced. |
| 30 | 0.1 | Very slight. |
| 40 | 0.6 | Do. |
| 50 | 0.8 | Do. |
| 60 | 0.8 | Slight. |
| 70 | 0.8 | Do. |
| 80 | 0.8 | Do. |
| Carbon dosage, lbs./lb. $AlCl_3$ | 0.007 | |

B.:
Type carbon and weight, Pittsburgh CPG, 137 g.
Bed dimensions, dia. x depth, in., 0.75 x 48.
Temperature, ° F., 120–140.
Flow rate and direction, 10 ml./min.—up.

| | Effluent stream analysis | | |
|---|---|---|---|
| Throughput, liters (cumulative) | Iron, p.p.m. | Organics, p.p.m. | Odor |
| Influent, average | 145 | 226.0 | Very slight. |
| 2 | 0 | 0.3 | |
| 4 | 6.4 | 0.4 | Do. |
| 6 | 72.5 | 0.6 | Do. |
| 8 | 102.3 | 0.5 | Do. |
| 10 | 105.2 | 0.5 | Do. |
| Carbon dosage, lbs./lb. $AlCl_3$ | 0.040 | | |

While only a portion of the iron is removed from the water phase by passing same through the activated carbon, as shown in B. above, one can see that the odor is improved and the organic contaminants are drastically reduced.

It should be evident to those skilled in the art that once the bed material has become spent in functioning as an absorption medium, the carbon may of course be switched to the filtration operation, previously discussed. The purified water phase now contains, as its major impurities, iron and dissolved HCl gas. In order to remove the iron from the water phase, it is first necessary to admix the water phase with a dilute hydrogen peroxide solution to oxidize substantially all of the ferrous ions present in the water phase to ferric ions. The amount of hydrogen peroxides employed will depend on the concentration of the ferrous ions present in the water phase. Preferably, the hydrogen peroxide is an aqueous solution containing from about 5 to 10 weight percent hydrogen peroxide and the hydrogen peroxide solution is added to the water phase in a sufficient quantity to be present in at least twice the stoichiometric quantity of the ferrous ions present in the water phase. Further, it is desirable that the water phase and the dilute hydrogen peroxide be maintained in contact with each other at a temperature within the range of about 100 to 160° F., preferably about 100° F., for a contact period of about 10 minutes.

Once the ferrous ions have been oxidized to ferric ions the water phase is passed through a second percolation zone containing an anion exchange resin, "Dowex 21K," for removal of the ferric ions from the water phase. The water phase is percolated downwardly through the second percolation zone at a flow rate of about 0.5 to 1.0 g.p.m. per sq. ft. of cross sectional bed area, and the water phase is maintained at a temperature in the range of about 100 to 160° F. during the passing of same through the second percolation zone. Data illustrating the effect of the removal of iron from the water phase containing the aluminum chloride is illustrated in the following table. Likewise, the data illustrates that effective iron removal is accomplished through a series of 5 cycles, each of which includes the loading and regenerating of the bed. Regeneration of the bed can be accomplished by any suitable means.

TABLE VI

| | Run Number | | | | |
|---|---|---|---|---|---|
| | 1 | 2 | 3 | 4 | 5 |
| | Cycle | | | | |
| | 1 | 2 | 3 | 4 | 5 |
| Iron in feed, total p.p.m. | 127 | 127 | 127 | 127 | 175 |
| Ferrous ion in feed, p.p.m. (after oxidation) | 4.5 | 4.5 | 4.5 | 4.5 | 5.3 |
| Throughput, bed vol., p.p.m. Fe: | | | | | |
| 5 | | | | 0.5 | 1.9 |
| 10 | 0.9 | 0.6 | 1.1 | 0.1 | 1.9 |
| 15 | | | | 0.5 | 1.9 |
| 20 | 1.6 | 3.2 | 3.8 | 0.5 | 2.2 |
| 25 | | | | 2.5 | 4.0 |
| 30 | 6.8 | 3.0 | 15.5 | 4.5 | 7.6 |
| 35 | | | | 9.5 | 11.0 |
| 40 | 22.5 | 8.4 | 35.5 | 15.2 | 16.0 |

The water phase, after the removal of the ferric ions, is then passed through a third percolation zone containing an ion exchange resin to remove substantially all of the dissolved HCl and recover an aqueous aluminum chloride solution essentially free of contaminants. The temperature of the water phase passing through the third percolation zone is maintained at a temperature in the range of about 100 to 160° F. and the water phase is passed downwardly through the third percolation zone at a flow rate of about 0.5 to 1.0 g.p.m. per sq. ft. of cross sectional bed area of said zone. Any suitable ion exchange resin, such as "Dowex 44," can be employed which is effective in removing the dissolved hydrogen chloride from the water phase. In order to illustrate the removal of the remainder of the dissolved hydrogen chloride from the water phase, the following table is presented.

TABLE VII

HCl in feed, percent 1.6 percent
throughput, bed vol.: HCl (effluent)
2 ---------------------------------- 0.3
4 ---------------------------------- 0.3
6 ---------------------------------- 0.3

The product thus obtained from the series of purification steps recited hereinabove provides an aqueous aluminum chloride solution sufficiently pure to be marketed as a technical grade aluminum chloride liquor.

The foregoing discussion and description has been made in connection with preferred specific embodiments of the preparation of an aqueous aluminum chloride solution from alkylation catalyst sludge. However, it is to be understood that the discussion and description is only intended to illustrate and teach those skilled in the art how to practice the invention, and such is not to unduly limit the scope of the invention which is to be found in the claims set forth hereinafter.

Having thus described the invention, I claim:

1. A method for recovering $AlCl_3$ from spent $AlCl_3$ alkylation catalyst sludge which comprises:
   (a) heating said sludge in the presence of inert carrier gas at a temperature in the range of about 100° F. to 160° F. and at a pressure of about 125 to 250 mm. Hg in an amount and for a period of time effective to remove a portion of dissolved HCl gas present in said sludge;
   (b) passing the HCl-stripped sludge into a hydrolysis zone wherein said sludge is contacted with an amount of water effective to hydrolyze said sludge;
   (c) passing the hydrolyzed sludge into a settling zone thereby allowing said hydrolyzed sludge to form a water phase and an organic phase;
   (d) separating said water phase from said organic phase;
   (e) filtering said water phase to produce a filtrate;
   (f) passing said filtrate through a percolation zone containing activated carbon;
   (g) admixing the product of step (f) and a dilute hydrogen peroxide solution to oxidize substantially all of the ferrous ions present in said product to the ferric ions;
   (h) passing the resulting product of step (g) through a second percolation zone containing an anion exchange resin; and
   (i) passing the resulting product of step (h) through a third percolation zone containing an ion exchange resin to remove substantially all of the dissolved HCl and recover an aqueous aluminum chloride solution essentially free of contaminants.

2. The method of claim 1 which includes the steps of:
   (a) passing a portion of the separated water phase through a coalescer zone;
   (b) passing the effluent from said coalescer zone through a cooling zone; and
   (c) returning the cooled effluent to said hydrolysis zone at a rate effective to maintain about 5 to 25 parts cooled effluent per part sludge in said hydrolysis zone and at a temperature effective to maintain the temperature in said hydrolysis zone within the range of about 140 to 160° F.

3. The method according to claim 2 wherein said water is present in about 1:1 weight ratio with said sludge and the resulting mixture is maintained at a temperature in the range of about 140 to 160° F.

4. The method according to claim 3 wherein said hydrolyzed sludge is maintained at a temperature within the range of about 100 to 160° F. in said settling zone for a period of time effective to form said water phase and said organic phase.

5. The method according to claim 4 wherein said water phase is maintained at a temperature in the range of about 100 to 160° F. and is filtered downwardly at a flow rate of about 0.1 to 0.5 g.p.m./sq. ft. of cross sectional area of the filter.

6. The method according to claim 5 wherein said filtrate is maintained at a temperature in the range of about 75 to 160° F. and is passed upwardly through said percolation zone at a flow rate of about 0.1 to 0.5 g.p.m./sq. ft. of cross sectional bed area of said zone.

7. The method according to claim 6 wherein said hydrogen peroxide is an aqueous solution containing from about 5 to 10 weight percent hydrogen peroxide, said hydrogen peroxide is added in a sufficient quantity to be present in at least twice the stoichiometric quantity of said ferrous ions, and the oxidation of said ferrous ions is carried out at a temperature within the range of about 100 to 160° F.

8. The method according to claim 7 wherein said product of step (g) is maintained at a temperature in the range of about 100 to 160° F. and said product is passed downwardly through said second percolation zone at a flow rate of about 0.5 to 1 g.p.m./sq. ft. of cross sectional bed area of said zone.

9. The method according to claim 8 wherein the resulting product of step (h) is maintained at a temperature in the range of about 100 to 160° F. and said resulting product is passed downwardly through said third percolation zone at a flow rate of about 0.5 to 1 g.p.m./sq. ft. of cross sectional bed area of said zone.

References Cited

UNITED STATES PATENTS

| 1,865,797 | 7/1932 | Shiffler | 23—154 |
| 2,525,830 | 10/1950 | Sailors et al. | 23—96 |
| 2,526,564 | 10/1950 | Hepp et al. | 23—96 |
| 2,905,537 | 9/1959 | Copenhaver | 23—154 XR |
| 2,927,139 | 3/1960 | Findlay | 23—154 XR |
| 2,929,682 | 3/1960 | Clark | 23—154 XR |
| 3,082,062 | 3/1963 | Preuss | 23—92 |

EDWARD STERN, Primary Examiner

U.S. Cl. X.R.

23—96, 154